United States Patent
Thomas, III et al.

(12) 
(10) Patent No.: US 6,317,292 B1
(45) Date of Patent: *Nov. 13, 2001

(54) PTFE FIBER BASED LINER FOR FLEXIBLE HIGH DENSITY MAGNETIC MEDIA

(75) Inventors: Fred C. Thomas, III, Ogden; Yiping Ma, Layton, both of UT (US)

(73) Assignee: Iomega Corporation, Roy, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/268,141

(22) Filed: Mar. 12, 1999

Related U.S. Application Data

(63) Continuation-in-part of application No. 09/021,501, filed on Feb. 10, 1998, now Pat. No. 6,148,495, and a continuation-in-part of application No. 08/613,880, filed on Mar. 11, 1996, now Pat. No. 6,185,803, said application No. 09/021,501, is a division of application No. 08/613,880, each is a division of application No.08/324,579, filed on Oct. 18, 1994, now abandoned, application No. 09/268,141, which is a continuation of application No. 08/681,095, filed on Jul. 27, 1996, now Pat. No. 5,677,818.

(51) Int. Cl.[7] .................................................. G11B 23/03
(52) U.S. Cl. .......................................... 360/133; 369/291
(58) Field of Search ........................... 369/291; 360/133; 206/312, 313, 308.1, 308.3; 15/256.5

(56) References Cited

U.S. PATENT DOCUMENTS

| | | | |
|---|---|---|---|
| 3,311,960 | 4/1967 | Kessler | 29/419.1 |
| 3,719,537 | 3/1973 | Wilcox | 156/72 |

(List continued on next page.)

FOREIGN PATENT DOCUMENTS

| | | | |
|---|---|---|---|
| 0 576 065A3 | * | 12/1993 | (EP) . |
| 0 612 072A1 | * | 8/1994 | (EP) . |
| 0 618 579 | | 10/1994 | (EP) . |
| 2 268 447 | | 1/1994 | (GB) . |
| 60-28069 | * | 2/1985 | (JP) . |
| 61-160886 | * | 7/1986 | (JP) . |
| 62-22774 | | 2/1987 | (JP) . |
| 62-29678 | | 2/1987 | (JP) . |
| 3-248383 | * | 11/1991 | (JP) . |

OTHER PUBLICATIONS

Godwin, Jim, "An Introduction to the Insite 325 Floptical Disk Drive" SPIE vol. 1078 Optical Data Storage Topical Meeting 71–79 (1989).

*Primary Examiner*—William Klimowicz
(74) *Attorney, Agent, or Firm*—Woodcock Washburn Kurtz Mackiewicz & Norris LLP

(57) ABSTRACT

A disk cartridge comprising a rotatable disk having upper and lower surfaces; an outer casing for rotatably housing the disk, the casing comprising upper and lower shells that mate to form the casing, each of the upper and lower shells having an inner surface disposed in facing relation to a respective surface of the disk; and a spun fabric liner comprising a plurality of PTFE fibers, the fabric liner being attached to the inner surface of one of the upper and lower shells, a main body of the fabric liner lying against the inner surface of the one shell and being spaced a predetermined distance from the respective surface of the disk, whereby the fibers wipe the surface of the disk while the main body of the liner remains spaced from the disk, thereby reducing drag on the disk.

10 Claims, 5 Drawing Sheets

U.S. PATENT DOCUMENTS

| | | | |
|---|---|---|---|
| 4,392,170 | 7/1983 | Okada | 360/133 |
| 4,586,606 | 5/1986 | Howey | 206/313 |
| 4,610,352 | 9/1986 | Howey et al. | 206/313 |
| 4,648,002 | 3/1987 | Mroz et al. | 360/137 |
| 4,680,661 * | 7/1987 | Oishi | 360/133 |
| 4,695,912 | 9/1987 | Moriwaki | 360/133 |
| 4,699,268 | 10/1987 | Oishi | 206/313 |
| 4,750,075 | 6/1988 | Oishi | 360/133 |
| 4,782,417 * | 11/1988 | Tanaka et al. | 360/133 |
| 4,791,516 | 12/1988 | Seto | 360/133 |
| 4,802,049 * | 1/1989 | Tanaka et al. | 360/133 |
| 4,812,938 | 3/1989 | Rogers et al. | 360/133 |
| 4,864,451 | 9/1989 | Iwasa et al. | 360/133 |
| 4,977,475 | 12/1990 | Shiba et al. | 360/133 |
| 5,006,948 | 4/1991 | Fukunaga et al. | 360/133 |
| 5,060,105 | 10/1991 | Howey | 160/133 |
| 5,083,231 | 1/1992 | Veenstra et al. | 360/133 |
| 5,115,961 | 5/1992 | Nakajima | 228/111 |
| 5,122,919 | 6/1992 | Takemae et al. | 360/133 |
| 5,179,487 | 1/1993 | Niitsuma et al. | 360/133 |
| 5,189,585 | 2/1993 | Kubo | 360/133 |
| 5,216,566 | 6/1993 | Obara et al. | 360/133 |
| 5,282,106 | 1/1994 | Saito et al. | 360/133 |
| 5,311,389 | 5/1994 | Howey | 360/133 |
| 5,398,151 | 3/1995 | Swanson et al. | 360/133 |
| 5,455,109 | 10/1995 | Atkinson et al. | 428/284 |
| 5,456,983 | 10/1995 | Sassa | 428/370 |
| 5,543,195 | 8/1996 | Squires et al. | 428/90 |
| 5,549,966 | 8/1996 | Sassa | 428/229 |
| 5,677,818 * | 10/1997 | Ma et al. | 360/133 |
| 5,726,971 | 3/1998 | Wanger et al. | 369/291 |
| 5,757,593 * | 5/1998 | Stoger | 360/130.33 |

* cited by examiner

PTFE FIBER BASED LINER FOR FLEXIBLE HIGH DENSITY MAGNETIC MEDIA

RELATED APPLICATIONS

This is a continuation-in-part application of application Ser. No. 08/613,880, now U.S. Pat. No. 6,185,803, filed Mar. 11, 1996, and application Ser. No. 09/021,501, now U.S. Pat. No. 6,148,495 filed Feb. 10, 1998 which is a divisional of Ser. No. 08/613,880, now U.S. Pat. No. 6,185,803, filed Mar. 11, 1996, both of which are divisionals of Ser. No. 08/324,579, filed Oct. 18, 1994, now abandoned, and a continuation of Ser. No. 08/681,095 filed Jul. 22, 1996 which issued as U.S. Pat. No. 5,677,818.

BACKGROUND

1. Field of the Invention

The present invention relates to disk cartridges for storing electronic information, and more particularly, to a disk cartridge having a spun fabric liner.

2. Description of the Prior Art

Removable disk cartridges for storing digital electronic information typically comprise an outer casing or shell that houses a magnetic, magneto-optical or optical disk upon which electronic information can be stored. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge at a given speed. The outer shell of the cartridge typically has an aperture near one edge to provide the recording heads of the drive with access to the disk. A shutter or door mechanism is often provided to cover the aperture when the cartridge is not in use to prevent dust or other contaminants from entering the cartridge and settling on the recording surface of the disk.

Although the cartridge shell and shutter mechanism provide some protection against contaminants entering the cartridge, some contaminants will inevitably reach the recording surface of the disk. For example, dust, smoke and other debris may enter the cartridge through the disk hub or through the cartridge shutter when the disk is inserted in a disk drive. Additionally, magnetic particles may be generated during manufacturing of the disk cartridge as well as during read/write operations in the disk drive. These contaminants can interfere with a read/write head causing errors and a potential loss of information.

To reduce the risk of read/write errors resulting from particles on the disk surface, cartridges often include one or more fabric liners within the cartridge placed in contact with the disk surface. These liners typically are formed of a mixture of non-woven fibers bonded together either thermally, with an adhesive binder, or through a hydroentangling process such as that described in U.S. Pat. No. 5,311,389.

As illustrated in U.S. Pat. Nos. 4,750,075, 5,006,948, 5,083,231 and 5,216,566, the fabric liners are typically affixed to the upper and lower halves of the cartridge shell between so that they lie in a plane above the respective surfaces of the disk. In each of these examples, lifters and opposing ribs are provided on the inner surfaces of the upper and lower shells to bring the fabric liners into contact with at least a portion of the disk surface. Essentially, the lifters and ribs cooperate to force the liners against the disk surface. While the use of lifters and/or ribs ensures that the fabric liner contacts the disk surface and wipes unwanted particles from the disk, the force with which the liners are pressed against the disk creates a significant amount of drag on the disk as it rotates within the cartridge. Increased drag requires a corresponding increase in the strength of the disk drive spindle motor. Additionally, the increased contact pressure between the liners and the disk increases wear on the disk surface.

As flexible media products have evolved the thickness of the magnetic recording layer has become progressively thinner. For example, the 1.44 MB floppy disk has a magnetic coating layer of about 2 microns thick. The 100 MB Zip™ disk has a magnetic coating layer which is about 0.4 microns thick, while the present generation Zip™ 250 disk has a thickness of about 0.24 microns. The Zip™ 250 disk is shown, for example, in application Ser. No. 09/161,007, filed Sep. 25, 1998.

Future generation flexible products are intended to have a magnetic coating thickness of about 0.15 microns or less. It can be seen from this progression of thinner and thinner magnetic coating layers that the task of wiping the media free of air suspended debris while at the same time not damaging the ever thinner magnetic coating is quite challenging.

Historically, non-woven fabrics made of cotton, polyester, rayon, nylon, polypropylene, cellulose and other low cost fibers have been used to wipe the surfaces of flexible media. In a typical floppy disk application, the liner is brought into contact with the flexible media surface through means of a lifter. Other methods include a fuzzed liner region where upstanding fibers were generated during the cartridge manufacturing process to contact the media surface. The ideal wiper is aggressive with its debris wiping action while at the same time being gentle in its physical interaction with the underlying thin magnetic coating. The fibers must not break easily and become a source of debris themselves. Also, a fiber which minimizes the wicking up of the media's lubricant in the process of wiping is of significant importance.

Accordingly, there is a need for a removable disk cartridge having a liner that provides adequate wiping of the disk to remove unwanted particles, that creates much less drag on the disk and does not damage the magnetic coating. The liner should also be low cost and easy to manufacture. The present invention satisfies these needs.

SUMMARY OF THE INVENTION

The present invention is directed to a disk cartridge having a non-woven liner of PTFE fibers. The disk cartridge comprises a rotatable disk having upper and lower surfaces and an outer casing for rotatably housing the disk. The casing comprises upper and lower shells that mate to form the casing. Each of the upper and lower shells has an inner surface disposed in facing relation to a respective surface of the disk. The cartridge has a head access opening on its front peripheral edge, and the upper and lower shells have grooves formed therein to provide sufficient space for the magnetic heads of a disk drive to move across the surface of the disk. A spun non-woven fabric liner comprising a plurality of PTFE fibers is attached to the inner surface of one of the upper and lower shells. A main body of the fabric liner lies against the inner surface of the shell and is spaced a predetermined distance from the corresponding surface of the disk. According to one embodiment of the present invention, a region of the fabric liner is subjected to a fuzzing process in which the bonded fibers in that region are loosened to form a region of upstanding fibers that extend from the main body of the liner to the surface of the disk. The fibers wipe the surface of the disk while the main body of the liner remains spaced from the disk thereby reducing drag. In a preferred embodiment, a second non-woven fabric liner is attached to the inner surface of the other of shells.

Preferably, the spacing between the main body of the fabric liner and the recording surface of the disk is in the range of about 0.2 to 0.8 mm. The spun non-woven liner preferably is attached to the inner surface of the shell by an adhesive. Additionally, the inner surfaces of the upper and lower shells preferably are substantially planar.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

Figure 1:
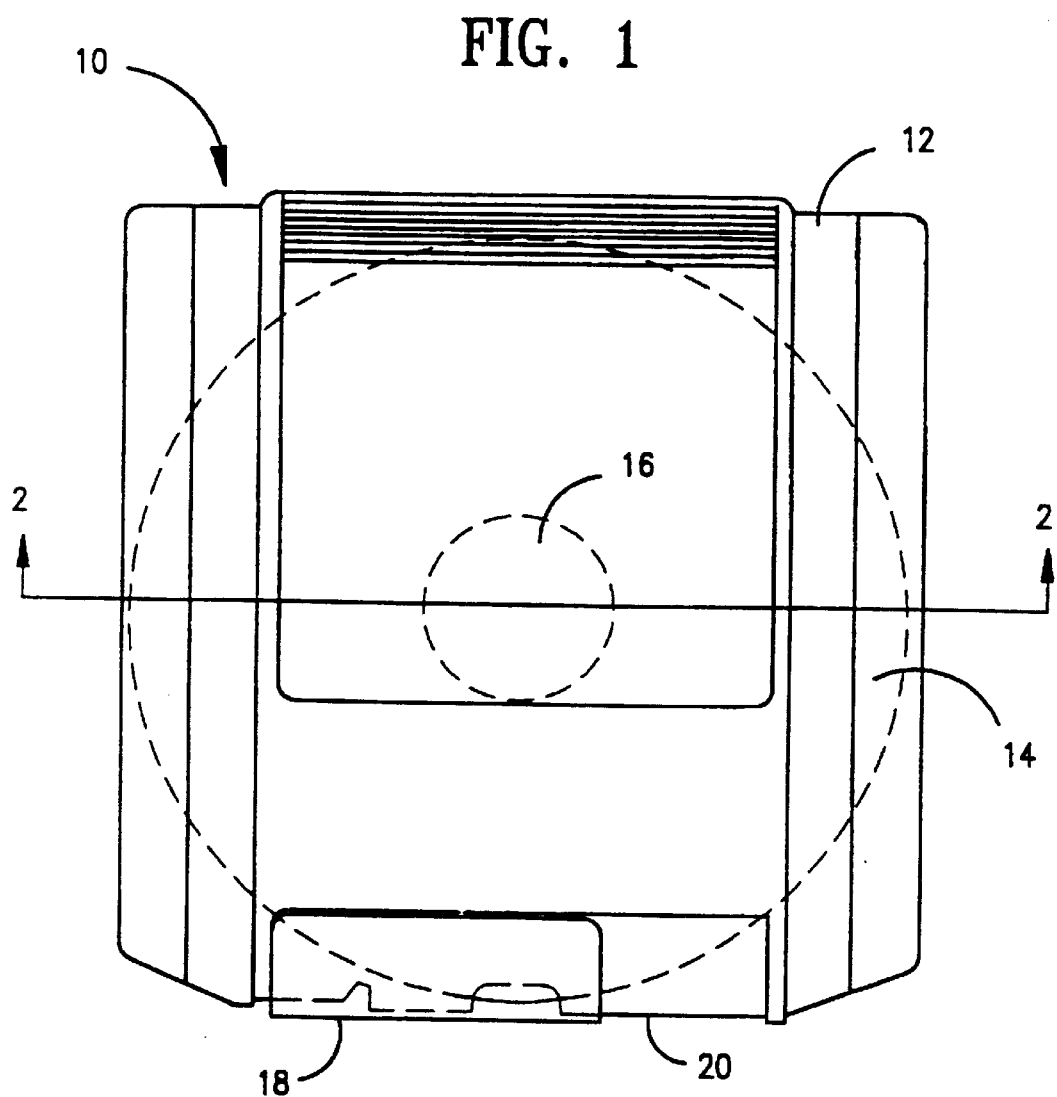
FIG. 1 is top view of a disk cartridge according a preferred embodiment of the present invention.

Referring to the drawings wherein like numerals indicate like elements throughout, there is shown in FIG. 1 a disk cartridge 10 comprising an outer casing 12 and a disk 14 having a hub 16 rotatably mounted in the casing 12. The casing 12 comprises upper and lower shells (FIGS. 3 & 4) that mate to form the casing. A shutter 18 is provided on the cartridge to cover an aperture (not shown) in the front edge 20 of the casing. When the cartridge is inserted into a disk drive (not shown), the shutter moves to the side exposing the aperture and thereby providing the read/write heads of the drive with access to the recording surface of the disk 14. In the present embodiment, the disk 14 comprises a flexible or floppy magnetic disk, however, in other embodiments, the disk may comprise a rigid magnetic disk, a magneto-optical disk or an optical storage medium. In the present embodiment, the magnetic disk 14 is formed of a thin (e.g., about 0.0025 inches), flexible, circular base of polymeric film. Each side of the flexible disk is coated with a layer of magnetic recording material to form upper and lower recording surfaces.

Figure 2:
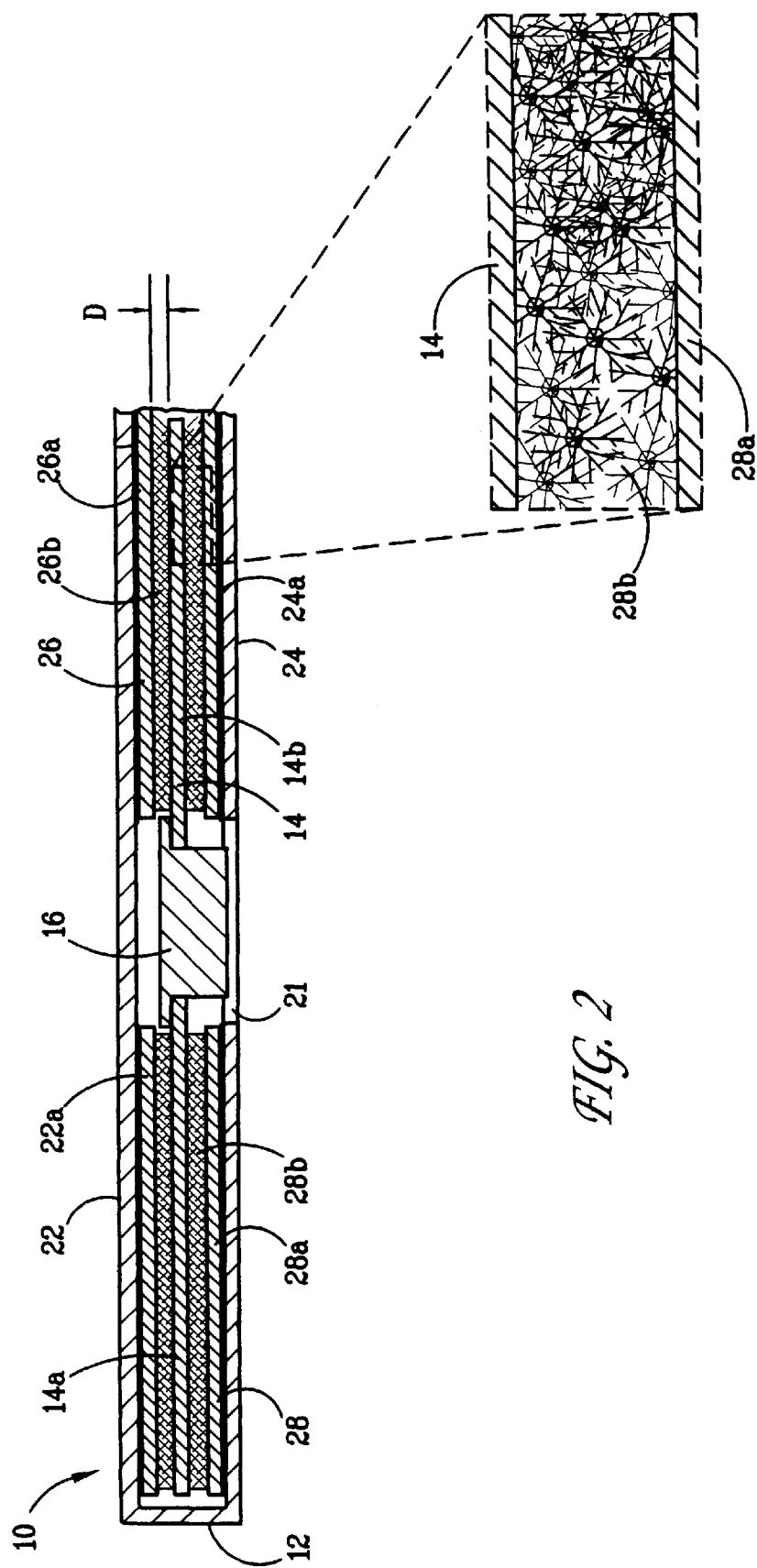
FIG. 2 is a sectional view of the cartridge of FIG. 1 taken along line 2—2 of FIG. 1.

Referring to FIG. 2, in greater detail, the upper shell 22 of the outer casing 12 has an inner surface 22a disposed in facing relation to the upper side 14a of the rotatable disk 14. Similarly, the lower shell 24 has an inner surface 24a disposed in facing relation to the lower surface 14b of the disk 14. As further shown, a circular cutout 21 is formed in the lower shell 24 to provide access to the disk hub 16. Preferably, the inner surfaces 22a, 24a of the upper and lower shells 22, 24 are substantially planar.

A first spun fabric liner 26 is attached to the inner surface 22a of the upper shell 22. Preferably, the liner 26 is formed of Teflon or "GoreTex" type fibers made of spun PTFE. Teflon is the most lubricous (slippery) manmade polymer there is. It is extremely tough and hence fibers made of it are significantly less likely to break than those made of similar diameter materials listed above. PTFE fibers do not individually wick fluids and hence allow for the media lubricant to remain on the media. The invention described herein is the application of PTFE fiber based fabrics for the purpose of wiping flexible (rigid also) magnetic and optical media for the purpose of air born debris removal while at the same time not damaging/scratching/wearing-away the recording layer.

As further shown in FIG. 2, a second fabric liner 28, which may be identical to the first liner 26, is attached to the inner surface 24a of the lower shell 24. The upstanding fibers 28b of the second liner 28 function identically to those of the first liner. The enlarged cross-sectional view of a portion of the second liner 28 provides further detail illustrating the fibers of the main body 28a of the liner, as well as the protruding fibers which wipe the surface of the disk. It has been found that use of the opposing liners in accordance with the preferred embodiment of the present invention has a tendency to stabilize the disk 14 during high speed rotation (e.g., about 3600 rpm). Stabilization of the rotating media is desirable. Additionally, because the fibers are not densely packed together, they can also serve to filter the air within the cartridge.

In the present embodiment, the first and second liners 26, 28 are attached to the respective planar surfaces 22a, 24a of the upper and lower shells 22, 24 using an adhesive 29. Specifically, in the preferred embodiment, an adhesive that cures under exposure to ultra-violet light is printed on the inner surfaces 22a, 24a of the upper and lower shells 22, 24 using conventional pad printing technologies with a flat transfer pad. The liners 26, 28 are then placed on the respective shell surfaces 22a, 24a. A flat circular plate capable of transmitting ultra-violet light is then placed over each liner to press each liner against its respective shell surface. An ultra-violet light source is then used to expose the adhesive to ultra-violet light through the UV transmittable plate thereby curing the adhesive and affixing the liner to the shell surface. While this method of attachment is preferred, it is understood that other suitable methods may be employed.

Figure 3:
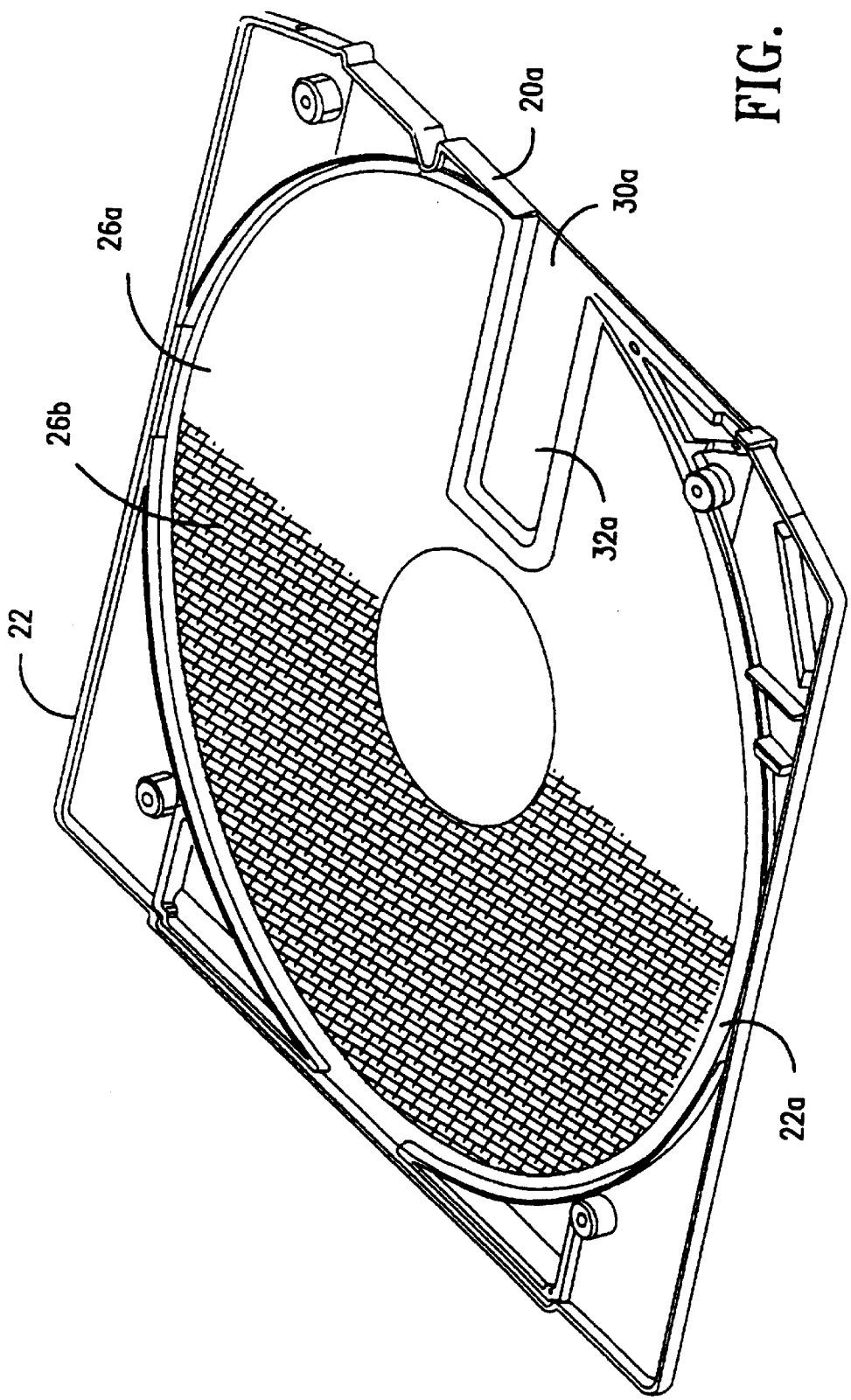
FIG. 3 is a perspective view of a fabric liner affixed to the inner surface of the lower shell of the cartridge of FIG. 1 and illustrates a region of the liner in accordance with the present invention.
Figure 4:
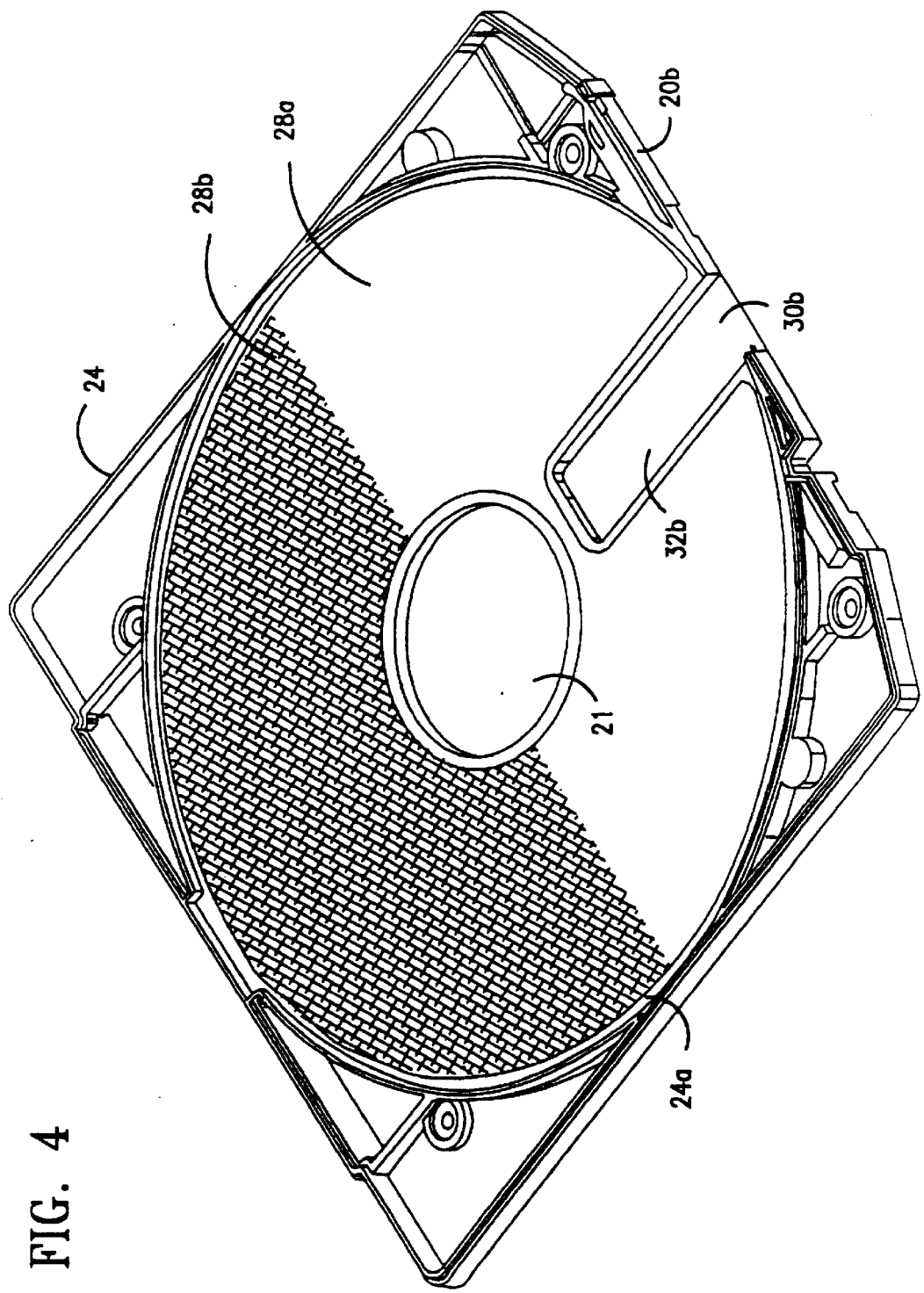
FIG. 4 is a perspective view of a fabric liner affixed to the inner surface of the upper shell of the cartridge of FIG. 1 and illustrates a region of the liner in accordance with the present invention.

FIGS. 3 and 4 show further details of the inner surfaces 22a, 24a of the upper and lower shells 22, 24, respectively. As shown in FIG. 3, the inner surface 22a of the upper shell 22 is substantially planar, and the main body 26a of the first fabric liner 26 is affixed to the inner surface 22a of the upper shell 22 so that it lies substantially flat against the planar surface 22a. An opening 30a is provided in the front edge 20a of the upper shell 22, and a groove 32a is formed in the upper shell 22 that extends from the opening 30 toward the center of the shell 22.

As shown in FIG. 4, the inner surface 24a of the lower shell 24 is also substantially planar, and the main body 28a of the second fabric liner 28 is affixed to the inner surface 24a of the lower shell 24 so that it too lies substantially flat against the planar surface 24a. As further shown, the lower shell 24 includes an opening 30b and a groove 32b similar to that formed in the upper shell 22. A circular opening 21 in the lower shell 24 provides access to the hub 16 of the disk 14.

The opening 30a and groove 32a in the upper shell 22a cooperate with the opening 30b and groove 32b in the lower shell to provide the magnetic heads (not shown) of a disk drive with access to the recording surface(s) of the disk 14. As FIGS. 3 and 4 illustrate, according to an important feature of the cartridge 10 of the present invention, there is no aperture or opening in either the upper or lower shell surfaces. Rather, the grooves 32a, 32b form a closed channel within the cartridge. The only aperture through which the magnetic heads of a disk drive can enter the cartridge is that formed on the front edge 20 of the cartridge 10 by the respective openings 30a and 30b. By providing an aperture only in the front edge 20 of the cartridge, the risk of contaminants entering the cartridge and reaching the recording surface of the disk 14 is reduced.

Figure 5:
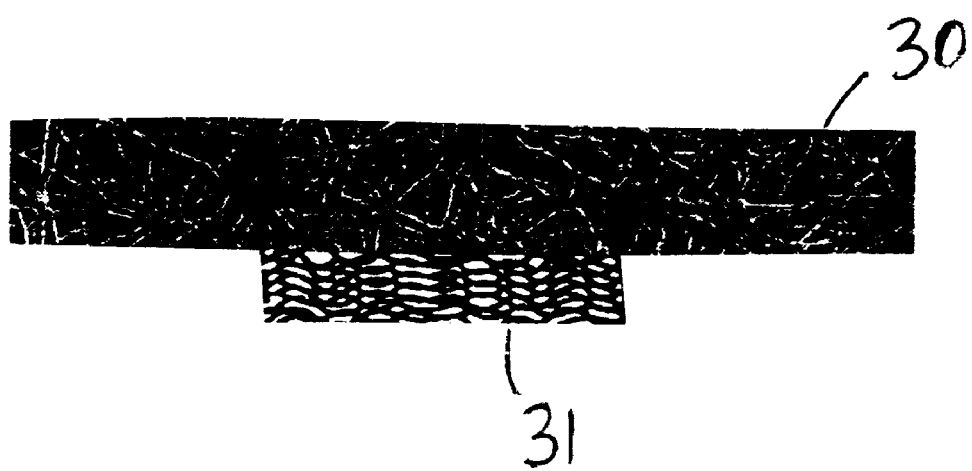
FIG. 5 shows a modification in which the PTFE liner has a non-woven fabric underlayer.

Multiple layers of fibers can be used, as shown in FIG. 5. The layer 30 closest to the disk and that performs the wiping function comprises PTFE fiber. Lower layers, such as layer 31, comprise suitable fibers to promote such things as bonding (e.g., heat meltable fiber) or electrical conductivity (to reduce ESD build-up). This method also allows for lower cost fibers to be used in conjunction with the PTFE fibers and hence obtain the desired functionality and benefits at the disk surface from the PTFE fibers, but allow the full thickness of the material to be built up without the need for all PTFE fiber, thereby lowering the cost.

The specification for an exemplary PTFE fiber liner in accordance with the present invention has a thickness of about 7.5 mils+/– about 15%. The fiber diameter is preferably about 10 to 20 microns nominal, and has a length of about 1 inch nominal. The fabric type is non-woven. Methods of bonding include hydro-entangled, spunbound, thermally bonded, caustic entangled, chemically bonded, and other processes that provide for random and numerous surface protruding wiping fibers. The electrical resistivity is preferably as low as possible to reduce ESD build-up.

A preferred material roll size is about 9 inch wide, 4500 ft. long, OD of about 18.5", core of roll is 3.375". This amount of material makes about 10,000 liners/wipers per roll. Sample material with this core inner diameter and 9" width would be optimal to fabricate liners.

The properties that make PTFE fiber desirable as a recording media wiper include: (1) non-flaking fiber, (2) high mechanical yield strength as compared to other fibers, therefore making fiber breakage less likely, (3) can be manufactured very cleanly without particle debris, (4) individual fibers are about twice the density of other fiber, therefore making them very non-absorbent of disk lubricants, and (5) highly lubricous and hence allows more forceful or more complete contact with the disk surface with equal or less wear on the thin recording layer.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A disk cartridge comprising:
   a rotatable disk having upper and lower surfaces;
   an outer casing for rotatably housing said disk, said casing comprising upper and lower shells that mate to form said casing, each of said upper and lower shells having an inner surface disposed in facing relation to a respective surface of said disk; and
   a spun fabric liner comprising a plurality of bonded PTFE fibers, said fabric liner being directly attached to, and in direct contact with, the inner surface of one of said upper and lower shells, a main body of said fabric liner lying against the inner surface of said one shell and being spaced a predetermined distance from the respective surface of said disk, whereby said fibers wipe the surface of said disk of debris while the main body of the liner remains spaced from said disk, thereby reducing drag on said disk, the bonds between the plurality of fibers in a region of the liner being loosened by a fuzzing process to create a region of loosened unbonded upstanding fibers, wherein each of said loosened unbonded upstanding fibers is individually unbonded from each other fiber and each loosened unbonded upstanding fiber extends from the main body of said liner to the surface of said disk, whereby said loosened unbonded upstanding fibers wipe the surface of said disk while the main body of the liner remains spaced from said disk thereby reducing drag on said disk.

2. A disk cartridge as recited in claim 1 further comprising:
   a second spun fabric liner comprising only a plurality of PTFE fibers, said second fabric liner being attached to the inner surface of the other of said upper and lower shells, a main body of said second fabric liner lying against the inner surface of said other shell and being spaced a predetermined distance from the respective surface of said disk.

3. A disk cartridge as recited in claim 1 wherein said predetermined distance is in the range of about 0.2 to 0.8 mm.

4. A disk cartridge as recited in claim 1 wherein said disk surface is lubricated and wherein each of said fibers has minimal wicking of the lubricant from the surface of said disk.

5. A disk cartridge as recited in claim 1 wherein said fabric liner is directly attached to the inner surface of said one shell by an adhesive.

6. A disk cartridge as recited in claim 1 wherein the inner surfaces of said upper and lower shells are substantially planar.

7. A disk cartridge as recited in claim 1 wherein said spun fabric liner has numerous fibers protruding randomly from a surface thereof for wiping said disk.

8. A disk cartridge as recited in claim 2 wherein said second fabric liner has a region of upstanding fibers that extend from the main body of said second fabric liner to the surface of said disk.

9. The disk cartridge of claim 1, wherein said rotatable disk is adapted to spin at a speed of at least about 1800 revolutions per minute.

10. The disk cartridge of claim 1, wherein said rotatable disk is adapted to spin at a speed of about 3600 revolutions per minute.

* * * * *